(12) United States Patent
Bae

(10) Patent No.: US 6,231,511 B1
(45) Date of Patent: May 15, 2001

(54) ULTRASONIC SIGNAL FOCUSING METHOD AND APPARATUS FOR ULTRASONIC IMAGING SYSTEM

(75) Inventor: Moo-Ho Bae, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 09/189,690

(22) Filed: Nov. 10, 1998

(30) Foreign Application Priority Data

Nov. 10, 1997 (KR) .................................................. 97-59057

(51) Int. Cl.[7] .................................................... A61B 8/00
(52) U.S. Cl. ............................................................. 600/447
(58) Field of Search .................................... 600/443, 447, 600/437, 444, 440, 441; 128/916; 367/7, 11, 138; 73/602, 597

(56) References Cited

U.S. PATENT DOCUMENTS

| | | | |
|---|---|---|---|
| 4,779,623 | * 10/1988 | Sumino et al. | 600/440 |
| 4,781,199 | * 11/1988 | Hirama et al. | 600/437 |
| 4,817,614 | * 4/1989 | Hassler et al. | 600/441 |
| 4,821,574 | * 4/1989 | Takamizawa | 73/602 |
| 5,331,964 | * 7/1994 | Trahey et al. | 600/447 |
| 5,605,154 | * 2/1997 | Ries et al. | 600/444 |
| 5,793,701 | * 8/1998 | Wright et al. | 367/7 |
| 5,856,955 | * 1/1999 | Cole et al. | 367/138 |

* cited by examiner

Primary Examiner—Marvin M. Lateef
Assistant Examiner—Ali M. Imam
(74) Attorney, Agent, or Firm—F. Chau & Associates, LLP

(57) ABSTRACT

An ultrasonic signal focusing method and apparatus is provided, in which an ultrasonic signal reflected from an object is focused at all points from and to which transmission and reception are performed on a scan line. The ultrasonic signal focusing method includes an ultrasonic signal transmission step for moving, focusing and transmission-scanning the transmission scan line in turn, using an array transducer, an ultrasonic signal reception step for receiving all the ultrasonic signals transmitted along the scan lines at the transducer elements which are placed in the location at which reception is enabled, an ultrasonic storing step for storing all the received ultrasonic signals by each scan line, and an ultrasonic focusing step for interpolating an arrival delay amount of the ultrasonic signals stored after arrival at a different point in time and summing the interpolated signal. Thus, all the signals obtained by performing transmission focusing on a number of adjacent scan lines are used to thereby perform reception focusing, to thereby provide the same effect as the case where focal points exists in all the points on the scan line.

10 Claims, 5 Drawing Sheets

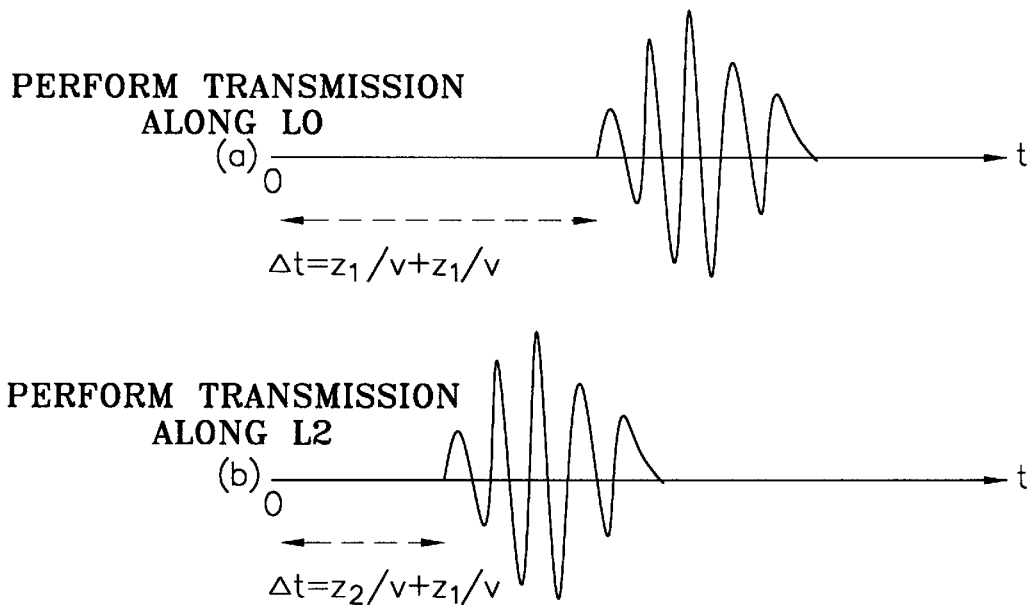
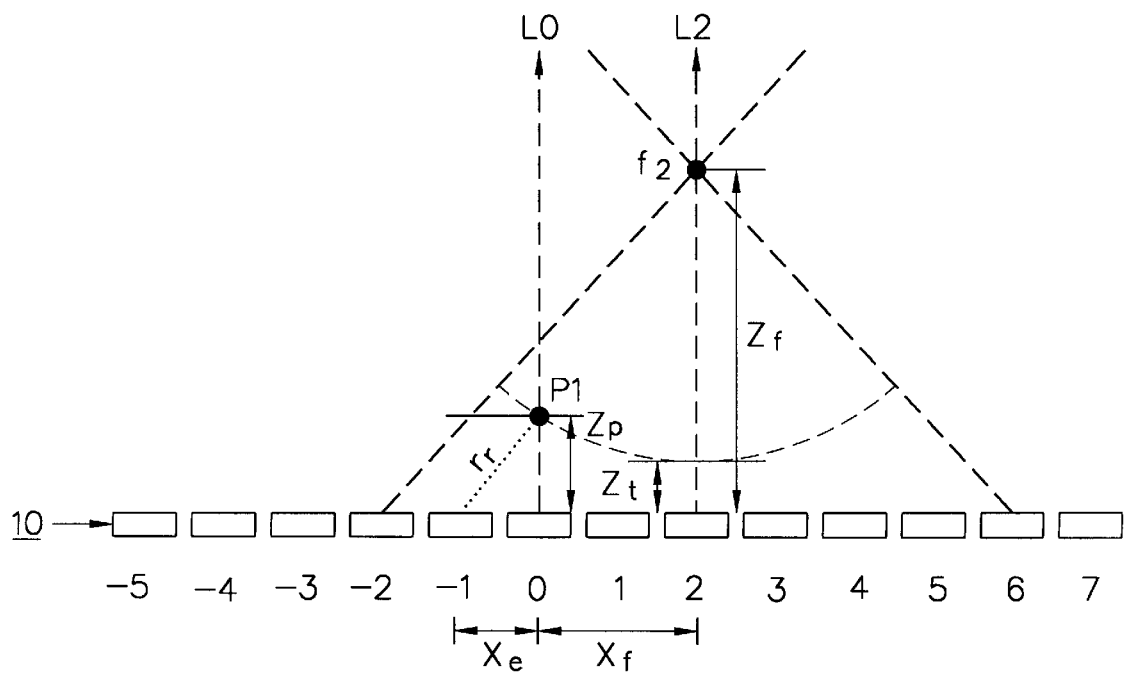

ULTRASONIC SIGNAL FOCUSING METHOD AND APPARATUS FOR ULTRASONIC IMAGING SYSTEM

BACKGROUND OF THE INVENTION

1. Field of the Invention

The present invention relates to an ultrasonic signal focusing method and apparatus for an ultrasonic imaging system, and more particularly, to an ultrasonic signal focusing method and apparatus for transmission-focusing and/or receipt-focusing of an ultrasonic signal emitted toward an object.

2. Description of the Related Art

In general, an ultrasonic imaging system uses an ultrasonic wave to show the internal sectional structure of an object such as a human body. The ultrasonic imaging system includes an ultrasonic signal focusing device and a imaging device. The ultrasonic signal focusing device emits an ultrasonic signal to an object, and converts the ultrasonic signal reflected from a discontinuous surface of acoustic impedance of the object, into an electrical signal, The imaging device uses the electrical signal to show the internal structure of the object.

In the ultrasonic imaging system, one of crucial factors required for functional improvement is an ultrasonic image resolution. It is steadily under development to improve the resolution. In case of the ultrasonic image, lateral resolution is worse than axial direction resolution. Focusing plays a major role of determining the lateral resolution. To improve the lateral resolution, the ultrasonic imaging system uses, as a probe, an array transducer comprised of a number of transducer elements, and performs transmission focusing and receipt focusing through an electrical signal processing. During performing receipt focusing, it is possible to use dynamic focusing in which the position of a focal point is successively moved from an position close to the array transducer to that far from it, considering the travelling speed of the ultrasonic wave. The dynamic focusing provides a better lateral resolution than the case where the focal point is fixed.

A general transmission focusing will be described below with reference to FIG. 1.

In FIG. 1, the x-axis is parallel with the ultrasonic transmission plane of an array transducer 10, and the z-axis is perpendicular to the ultrasonic transmission plane thereof. For clarity, a point where a scan line intersects the surface of a particular transducer element in the array transducer 10 is determined as the origin (0, 0), and the transducer element located at the origin is called a "transducer element 0." Here, the scan line connects the center of the ultrasonic transmission plane of the "transducer element 0" with a transmission focal point F in the case where a steering angle is θ.

To make ultrasonic pulses emitted from all transducer elements reach the transmission focal point F at the same time, a transducer element farther from the origin should emit an ultrasonic pulse earlier than that closer to the origin do. For instance, a "transducer element 3" should transmit an ultrasonic pulse earlier by l3/v than the "transducer element 0" do. Here, "v" is the velocity of the ultrasonic pulse, "r" is the distance from the origin to the focal point F, and "l" is the distance difference between the distance r and the distance r+l from the ultrasonic transmission plane of the transducer element placed at the location which is not the origin to the focal point F. Thus, when the steering angle θ by which each of the scan lines indicated as solid lines rotated counterclockwise from the z-axis is used, a transmission delay time $t_d(x_1)$ for a delay unit corresponding to a "transducer element 1" having a position $x_1$ is obtained by the following equation (1).

$$t_d(x_1) = -\frac{\sqrt{r^2 + x_1^2 + 2rx_1\sin\theta} - r}{v} \tag{1}$$

It is not possible to assign a negative transmission delay time value to the delay units. Therefore, in reality, it is required that all transmission delay time values become positive number by adding a positive value to the transmission delay time values corresponding to all transducer elements.

However, for convenience of explanation, it is assumed that it is possible to assign a negative transmission delay time value to the delay unit. Also, an instantaneous time when a "transducer element 0" transmits an ultrasonic pulse is defined as "0." Then, by replacing the r in the equation (1) by vt/2, transmission delay time or reception delay time corresponding to a transducer element having the center position x is expressed as the following equation (2).

$$t_d(t, x) = -\frac{\sqrt{(vt/2)^2 + x^2 + vtx\sin\theta}}{v} + \frac{t}{2} \tag{2}$$

Here, "t" is time taken when the ultrasonic pulse reciprocates from a transducer element to the focal point F.

When a transmission delay time of the equation (2) is used for each electrical pulse generated in a pulse generator (not shown), the ultrasonic pulses transmitted toward the focal point F by the transducer elements form ripples as shown in FIG. 2. In FIG. 2, each ripple results from the fact that the transducer elements delay one pulse outgoing from the pulse generator by different transmission delay times and transmit the delayed result.

During transmission focusing, all ultrasonic pulses reach the focal point F at the same time, and all the ultrasonic pulses having reached the focal point F have the same phase. Thus, an amplitude or intensity of the ultrasonic wave becomes maximized at the focal point F. However, the ultrasonic pulses do not reach the location A or B different from the focal point F at the same time and have a different phase from each other. As a result, the ultrasonic pulses offset each other destructively and the intensity of the ultrasonic wave in the location A or B becomes smaller compared to the focal point F. In this case, as it is distant further toward the lateral direction than the axial direction, the intensity of the ultrasonic pulse becomes much smaller.

Resolution is determined as a combinational result of the transmission/reception focusing as described above. Since the focal point should be fixed during transmission focusing, the receipt focusing is ideal. Even in the case of the receipt focusing, the lateral resolution is best in the vicinity of the focal point and becomes comparatively poor in the different positions thereof.

SUMMARY OF THE INVENTION

To solve the above problems, it is an object of the present invention to provide an ultrasonic signal focusing method and apparatus for an ultrasonic imaging system in which ultrasonic signals used for an object are focused at all possible points to be transmitted and received along a scan line.

In other words, to overcome the demerits of the existing ultrasonic imaging system in which lateral resolution becomes lowered as it grows further from a transmission focal point, it is an object of the present invention to provide a signal focusing method and apparatus for an ultrasonic imaging system in which the whole resolution is enhanced by performing transmission/reception focusing as if focal points is placed at all points on a scan line.

To accomplish the above object of the present invention, there is provided an ultrasonic signal focusing method using an array transducer, characterized in that successive transmission/reception focusing is performed using all transmission focusing signals of adjacent different transmission scan lines in order to obtain a scan line where the ultrasonic signal is focused.

There is also provided an ultrasonic focusing apparatus for focusing an ultrasonic signal, comprising: an array transducer configured to have a different time delay in a transducer element located at a different place each other, for performing lateral transmission focusing; a reception portion for appropriately amplifying the ultrasonic signal returning to the transducer element and converting the amplified result into a digital signal; an intra-channel processing portion for separately storing signals received from the reception portion every time when the received signals are transmitted, calculating a time delay to be applied to the stored ultrasonic received signals and focusing signals on various transmission scan lines in a single transducer element; and a reception focusing portion for summing all the outputs of the intra-channel processing portion and completing a focusing operation using the signals output from all the transducer elements.

BRIEF DESCRIPTION OF THE DRAWINGS

The above object and other advantages of the present invention will become more apparent by describing the preferred embodiments thereof in more detail with reference to the accompanying drawings in which:

FIGS. 3 and 5 are conceptual views for explaining ultrasonic signal focusing according to a preferred embodiment of the present invention;

FIG. 4 is a view for comparatively explaining the cases where ultrasonic pulses transmitted by a transducer element along scan lines L0 and L2 reach the target point and then return to the transducer element;

DETAILED DESCRIPTION OF THE PREFERRED EMBODIMENT

A preferred embodiment of the present invention will be described with reference to the accompanying drawings.

Figure 3:
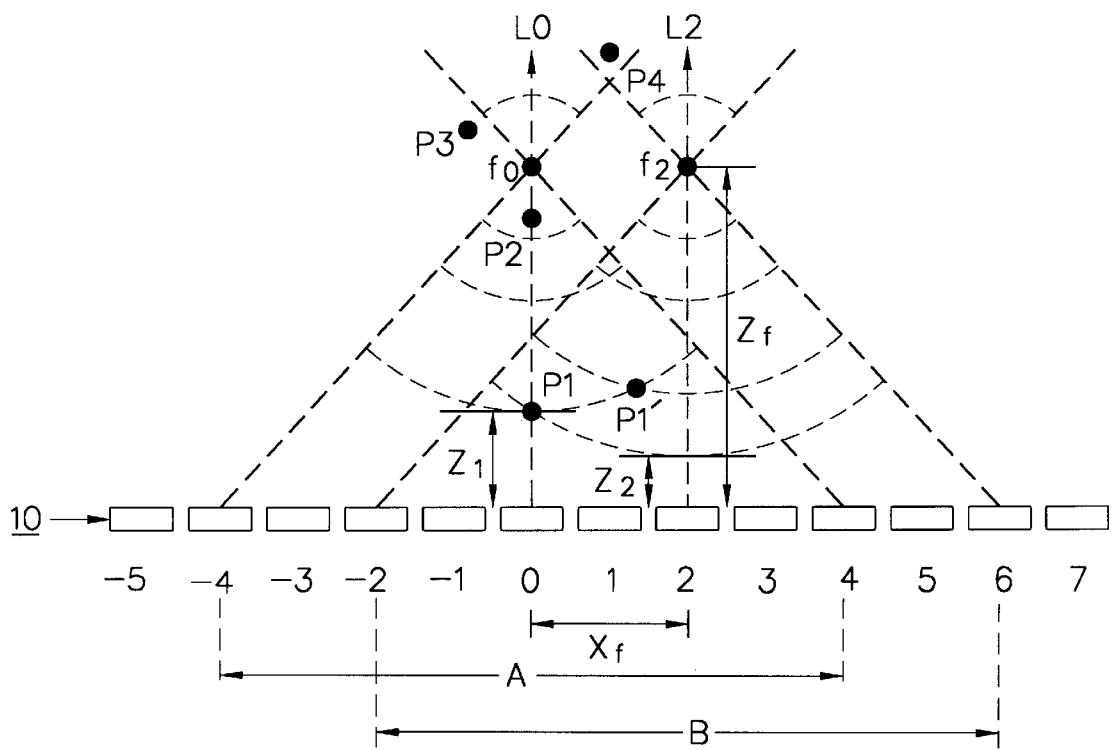

FIG. 3 is a geometrical view for explaining an ultrasonic signal focusing adopted by the present invention. In FIG. 3, $f_0$ and $f_2$ denote focal points, and P1, P1', P2, P3 and P4 denote target points. Also, $Z_1$ denotes a length of the path until an ultrasonic pulse emitted toward a focal point $f_0$ along a scan line L0 by a "transducer element 0" reaches a target point P1, $Z_2$ denotes the length of the path corresponding to a time interval taken until an ultrasonic pulse emitted toward a focal point $f_2$ along a scan line L2 by a "transducer element 2" reaches the target point P1. $Z_f$ denotes the length of the path until an ultrasonic pulse emitted toward a focal point $f_2$ along a scan line L2 by a "transducer element 2" reaches the focal point $f_2$, and $X_f$ denotes the distance between the "transducer element 0" and the "transducer element 2."

FIG. 4 is a view for explaining ultrasonic pulses transmitted along the scan lines L0 and L2 shown in FIG. 3 and then returning the target point P1. In FIG. 4, the waveform (a) shows the time taken when the ultrasonic pulse transmitted toward the focal point $f_0$ on the scan line L0 returns to a "transducer element 0" from the target point P1, and the waveform (b) shows the time taken when the ultrasonic pulse transmitted toward the focal point $f_2$ returns to the "transducer element 0" from the target point P1.

A "transducer element—4" through a "transducer element 4" within the section "A" emit the ultrasonic pulses toward the focal point $f_0$ on the scan line L0 so as to be transmission-focused. A "transducer element—2" through a "transducer element 6" within the section "B" emit the ultrasonic pulses toward the focal point $f_2$ on the scan line L2 so as to be transmission-focused. The ultrasonic pulse transmitted with respect to the scan line L0 is started from the "transducer element 0" and then reaches the target point P1 after the time taken when travelling the distance Z1 has elapsed. Then, the ultrasonic pulse returns to the "transducer element 0" after the time corresponding to the distance Z1 has elapsed. The ultrasonic pulse transmitted with respect to the scan line L2 is started from the "transducer element 2" and then reaches the target point P1 after the time taken when travelling the distance Z2 has elapsed. Then, the ultrasonic pulse having reached the target point P1 is received at the "transducer element 0" after the time corresponding to the distance Z1 has elapsed. The ultrasonic pulses transmitted toward the focal point $f_0$ from the "transducer element 0" and the "transducer element 2" reach the focal point $f_0$ at the same time by transmission focusing. Therefore, the time taken when the ultrasonic pulse transmitted from the "transducer element 0" reaches the point P1 is the same as that when the ultrasonic pulse transmitted from the "transducer element 2" reaches the point P1'. The above relationship is shown in FIG. 3 as a dotted circle having the center of the focal point $f_0$.

In the case of the two reception ultrasonic pulses received at the "transducer element 0," that is, in the case of the reception ultrasonic pulse obtained from the ultrasonic pulse transmitted toward the transmission focal point $f_0$ on the scan line L0 and the reception ultrasonic pulse obtained from the ultrasonic pulse transmitted toward the transmission focal point $f_2$ on the scan line L2, their delay times are adjusted so that the reception ultrasonic pulses reflected from the target point P1 can be added at the same time. By doing so, the signal intensity of the reception ultrasonic pulse which corresponds to the target point P1 is transmitted toward the transmission focal point $f_0$ and received at the "transducer element 0", is reinforced using the reception ultrasonic pulse which is transmitted toward the transmission focal point $f_2$, reflected from the target point P1 and then received at the "transducer element 0."

When the signals obtained by performing the transmission focusing with respect to all the scan lines are synthesized, the reception ultrasonic pulses reflected from the final target point are aligned in phase with respect to the envelope and then added thereto. Accordingly, the signal intensity corresponding to the target point becomes larger but the signal intensity corresponding to the remaining points do not become large.

Referring to FIG. 3, the delay time necessary for reinforcing the signal intensity will be described below. Considering the "transducer element 0," the "transducer element 2," and the target point P1, the following equation (3) is satisfied.

$$Z_2 = Z_f - \sqrt{X_f^2 + (Z_f - Z_1)^2} \tag{3}$$

Using the relationship of $Z_1 = vt/2$, the equation (3) can be replaced by the following equation (4).

$$t_d(t, X_f) = \frac{(Z_1 - Z_2)}{v} = \frac{t}{2} - \frac{Z_f - \sqrt{X_f^2 + (Z_f - vt/2)^2}}{v} \tag{4}$$

The equation (4) shows the delay time of the reception ultrasonic pulse received from the target point P1 at the "transducer element 0" with respect to the ultrasonic pulse transmitted toward the focal point $f_2$ on the scan line L2 from the "transducer element 2."

When ultrasonic signals are synthesized after ultrasonic pulses are transmitted and received, there is no need to sum the signals obtained by performing transmission focusing on the adjacent various scan lines at the same ratio therebetween. To improve the lateral resolution, there are various methods, one of which is using weight values. For example, assuming that the weight value of the signal returning from the signal emitted toward the transmission a focal point on the scan line L0 is "1," it is defined that the weight value of the signal returning from the signal emitted toward the transmission focal point on the scan line L2 is "0.7," and the weight value of the signal returning from the signal emitted toward the transmission focal point on the further scan line L3 is "0.5," and then the two weight values are added. This method is called an apodization in a beam forming technique. In this invention, the lateral resolution can be enhanced using apodization appropriately.

Until now, the case where only the "transducer element 0" is received for the scan line L0 has been described. However, all the adjacent transducer elements (e.g. a "transducer element—4" through a "transducer element 4" in FIG. 3) which can be participated in the transmission focusing with respect to the focal point $f_0$ on the scan line L0 can be contributed in the reinforcement of the signal intensity with respect to all possible target points on the scan line L0.

For example, a signal received at the "transducer element 0" after being transmitted along the scan line L0 is defined as a "reference signal".

The signal transmitted along the scan line L2 is received by the "transducer element 1" and is then stored. A proper delay time is assigned to the stored signal. The delayed signal is added to the reference signal, in order to reinforce the reference signal obtained from a target point on the scan line L0. It is preferable that the target point may not be fixed, and would be better move on the scan line L0 along with the travelling of the ultrasonic pulse. By doing so, the signals from the object obtained from all the desired target points on the scan line L0 become larger due to constructive or reinforcing interference, but the signals from the other points become smaller due to destructive interference, to thereby improve the resolution.

FIG. 5 is a view for explaining the delay time which is used for ultrasonic pulse received at the adjacent "transducer element—1" in order to reinforce the ultrasonic pulse received at the "transducer element 0." For clarity, the transmission scan line L2 passes through the focal point $f_2$ from the point $(X_f, 0)$, and the coordinate of the focal point $f_2$ is $(X_f, Z_f)$. Also, it is defined that a transducer element receiving the ultrasonic pulse is located at the point $(X_e, 0)$ and the scan line which can be finally focused is L0 passing through the origin (0,0). Then, to reinforce the ultrasonic pulse received at the "transducer element 0" from the target point P1, the delay time added to the ultrasonic pulse received at the "transducer element—1" is expressed as follows.

$$t_d(P1, X_f, Z_f, X_e) = \frac{2Z_p}{v} - \left(\frac{Z_t}{v} + \frac{r_r}{v}\right) \tag{5}$$

Here, $Z_t$ and $r_r$ can be expressed by the following equation (6).

$$Z_t = Z_f - \sqrt{(Z_{f-Z_p})^2 + X_f^2}, r_r = \sqrt{Z_p^2 + X_e^2} \tag{6}$$

Therefore, the delay time is expressed as the following equation (7).

$$t_d = (P1, X_f, Z_f, X_e) \tag{7}$$

$$= \frac{2Z_p}{v} - \left[\frac{Z_f - \sqrt{(Z_f - Z_p)^2 + X_f^2}}{v} + \frac{\sqrt{Z_p^2 + X_e^2}}{v}\right]$$

When P1 is replaced by $Z_p = vt/2$, the following equation (8) is obtained.

$$t_d(t, X_f, Z_f, X_e) = \tag{8}$$

$$t - \left[\frac{Z_f - \sqrt{(Z_f - (vt/2))^2 + X_f^2}}{v} + \frac{\sqrt{(vt/2)^2 + X_e^2}}{v}\right]$$

Therefore, when the ultrasonic pulse received by the "transducer element −1" located at the point $(X_e, 0)$ is $s(t, X_f, Z_f, X_e)$, the finally resulting signal $S_{focused}(t)$ with respect to the target point P1 is expressed as the following equation (9).

$$S_{focused}(t) = \sum_{X_e}\sum_{X_f}(A(t, X_e, X_f) \cdot s(t - t_d(t, X_f, Z_f, X_e), X_f, Z_f, X_e)) \tag{9}$$

Here, $A(t, X_e, X_f)$ is the apodization factor as described above, and uses a respectively appropriate function according to t, $X_e$, and $X_f$.

$$\sum_{X_f}\cdot$$

denotes a summation for all the transmission scan lines allowing the reception of the ultrasonic pulse with respect to the target point P1, and $$\sum_{X_e}\cdot$$

denotes a summation for all the transducer elements receiving the ultrasonic pulse reflected from the target point P1. In this case, t is also "0" as described above every time when it is transmitted. Also, Xe and $X_f$ are added while varying them in an appropriate interval within an appropriate range. To perform the above focusing, even in the case of the finally focused single scan line, signals within a certain range are needed with respect to a number of $X_e$ and $X_f$. However, if the position of the finally focused scan line is slowly moved from the previous position, most of the signals can be used without any change. Some signals are nothing but added or a part of the signals is deleted therefrom. Till now, for convenience of explanation, the case where the scan line to be finally focused is fixed has been described. However, the finally focusing scan line may be actually moved, in which case the x-axis of the equations may be moved in parallel therewith.

Figure 6:
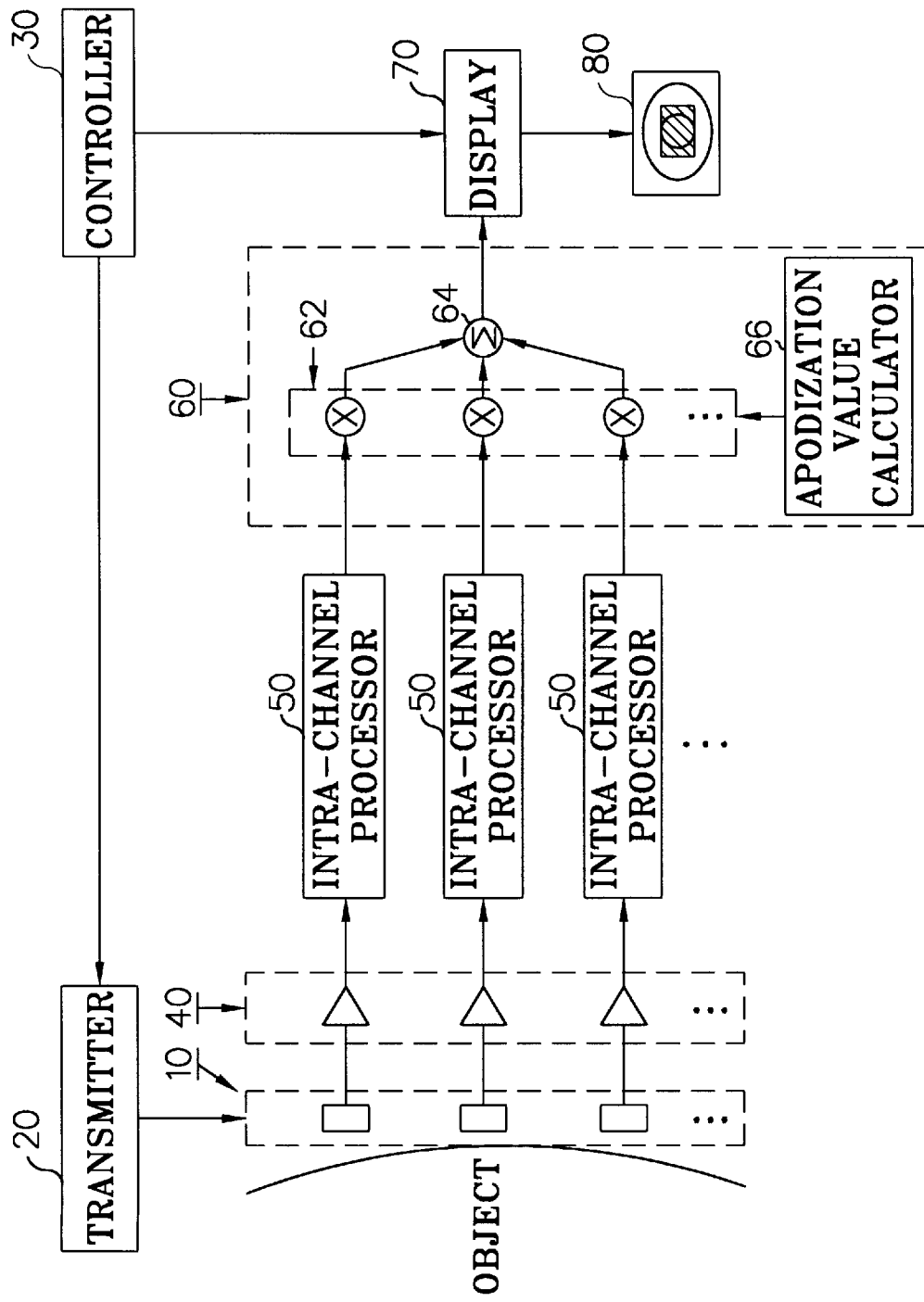
FIG. 6 shows an ultrasonic signal focusing apparatus according to the present invention.

FIG. 6 shows a focusing apparatus for an ultrasonic imaging system according to a preferred embodiment of the present invention. The electrical pulses generated in a transmitter 20 are applied to transducer elements in an array transducer 10, respectively. In this case, each of the electrical pulses is made to have a respectively different time delay according to a transducer element located at a respectively different location, to thereby perform lateral transmission focusing. The transducer elements emit a respective ultrasonic pulse according to the voltage of the electrical pulses. The ultrasonic pulses are transmitted into an object and then reflected from a point in the object. Subsequently, the reflected ultrasonic pulses are incident to the transducer elements in the array transducer 10 and converted into electrical signals. A receiver 40 which includes a number of amplifiers, amplifies the ultrasonic pulses output from the transducer elements appropriately and converts the amplified results into digital signals. Each intra-channel processor 50 receives the digital signal from each amplifier of the receiver 40, stores it separately every time when it is transmitted, and performs an operation corresponding to the addition $$(\sum_{X_f})$$

of $X_f$ term in the above equation (9).

A reception focusing portion 60 includes multipliers 62, an adder 64 and an intra-channel apodization value calculator 66. Each of the multipliers 62 multiplies the data output from the corresponding intra-channel processor 50 by an apodization value supplied from the intra-channel apodization value calculator 66, and outputs the multiplication result to the adder 64. The adder 64 adds the data supplied from the multipliers 62 and supplies the resultant final focused value to a display 70. The display 70 displays final focused values as a focused ultrasonic signal, on a monitor 80.

Figure 7:
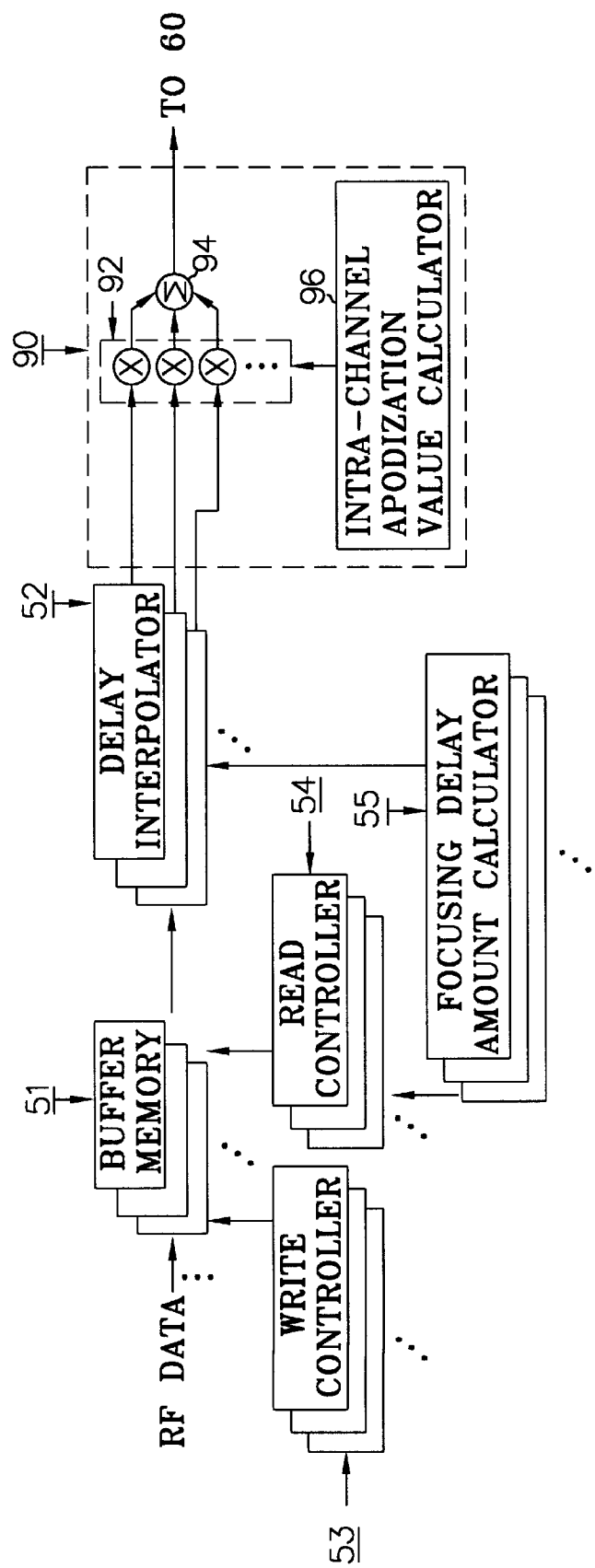
FIG. 7 shows an intra-channel processing portion in the FIG. 6 apparatus.

FIG. 7 shows a detailed structure of the intra-channel processor 50 shown in FIG. 6. The intra-channel processor 50 includes a plurality of buffer memories 51. Each buffer memory 51 receives radio frequency (RF) data which is applied from the receiver 40 and is converted into digital signal from the received ultrasonic pulse, and stores radio frequency (RF) data in sequence, under the control of a corresponding write controller 53. Each buffer memory 51 supplies the stored data to a delay interpolator 52 under the control of a read controller 54. The read controllers 54 are configured to correspond to each of the plurality of buffer memories 51. Each read controller 54 reads the data stored in a corresponding buffer memory 51, according to a delay amount applied from a focusing delay amount calculator 55. Each buffer memory 51 includes a plurality of static random access memory (SRAM) therein, in which one SRAM records the RF data therein and another SRAM outputs the previously recorded RF data, alternately. Therefore, there is not interference in writing and reading operations. During reading, data is not changed.

The focusing delay amount calculator 55 calculate delay times using the above equation (8) in order to focus the data stored in the buffer memory 51. The process adopting the equation (8) is substantially the same as one of the existing digital focusing methods. For example, the focusing delay time expressed in the equation (8) is divided by a sampling interval which is used for the analog-digital conversion in the receiver 40, to be separated into an integer portion and a fraction portion. The focusing delay amount calculator 55 calculates a read address from data of the integer portion and outputs the calculated read address to the read controller 54 corresponding the read address. The focusing delay amount calculator 55 supplies data of the fraction portion to a corresponding delay interpolator 52. Each read controller 54 reads the data from a corresponding buffer memory 51 using the corresponding read address and outputs the read data to a corresponding delay interpolator 52. Each delay interpolator 52 time-delays and interpolates the data output from the corresponding buffer memory 51 according to the fraction data applied from the focusing delay amount calculator 55, to thereby generate the time delayed and interpolated data. To do so, the delay interpolator 52 determines several data corresponding to the fraction data output from the focusing delay amount calculator 55, by using the data supplied from the corresponding buffer memory 51 and interpolates the determined data. As a result, the delay interpolator 52 can delay the data output from the buffer memory 51 by an accurate interval of time according to the delay amount from the focusing delay amount calculator 55. The data generated by the delay interpolator 52 is output to the apodization portion 90. Each multiplier 92 in the apodization portion 90 multiplies the data supplied from the corresponding delay interpolator 52 by the corresponding apodization value calculated in the intra-channel apodization value calculator 96. All the processes described above are performed at the portion corresponding to each transmission scan line at the same time and the generated interpolated data passes through a corresponding multiplier 92 and is supplied to the adder 94. The adder 94 adds the signals output from the multipliers 92 and outputs the finally focused signal.

Figure 1:
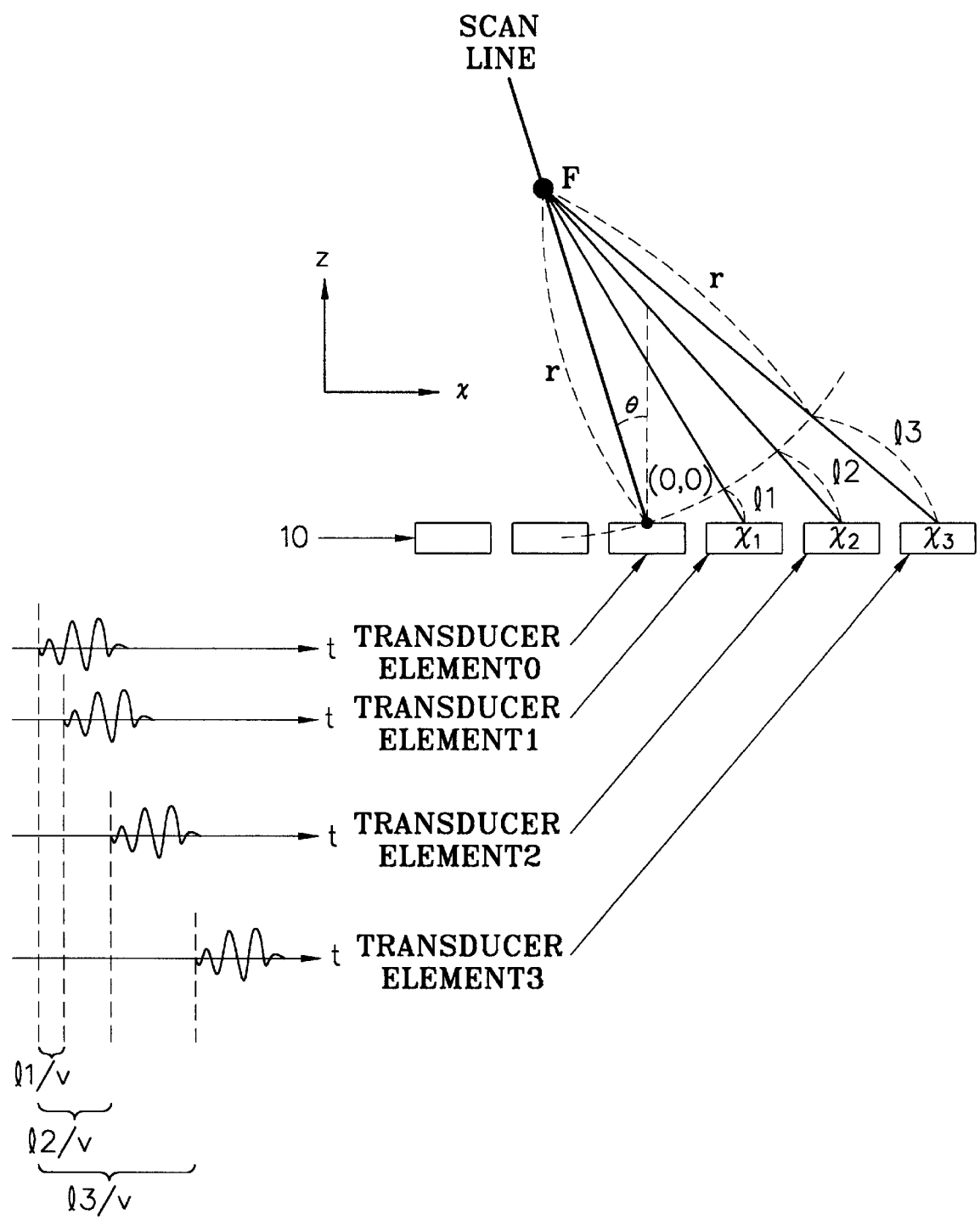
FIG. 1 is a conceptual view for explaining the principle of existing art which performs transmission focusing on a focal point F.
Figure 2:
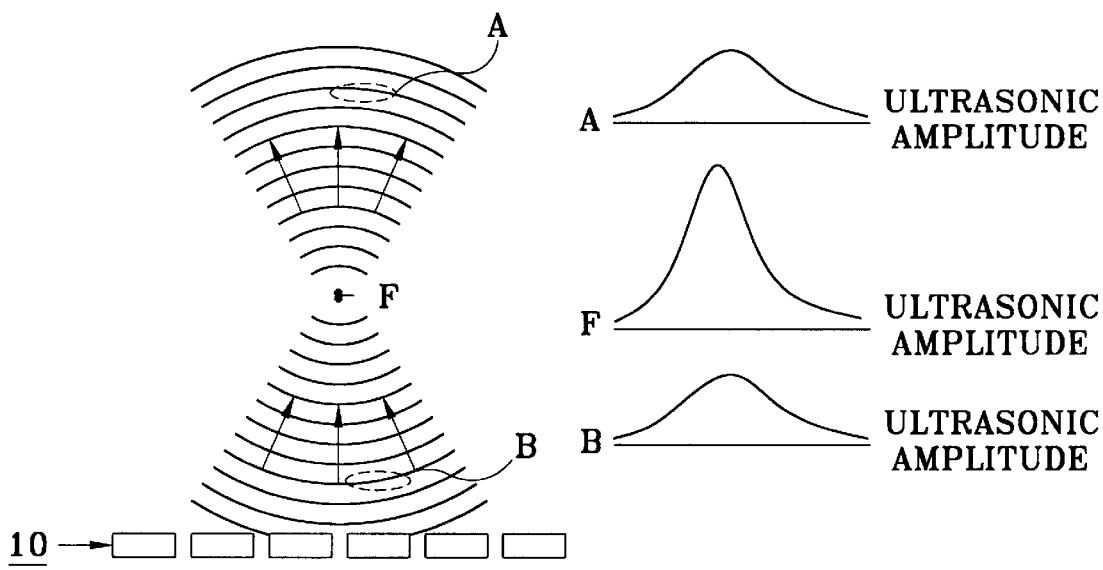
FIG. 2 shows the state where ultrasonic pulses proceed toward a focal point F in a prior art transmission focusing.

Until now, for convenience of explanation in the present invention, only the case where θ=0 in the linear array transducer, that is, there is no beam steering, has been described. However, the same method can actually be applied to all the focusing operations in principle. For example, the above-described method can be applied to a convex array, a steering, and a 2-dimensional array. Further, according to the present invention, it is possible to locate a focal point shown in FIG. 2 at a behind position of a array transducer, so that ultrasonic pluses emitted from the array transducer form ripples having a form of divergence. In the present invention, transmission is performed while a focal point is changed in turn. Every time when transmission is performed, reception is performed by all the transducer elements and received data are stored, respectively, and then focusing using the stored signal is performed. In this manner, all the signals obtained by performing transmission focusing on a number of adjacent scan lines are used, to thereby provide the same effect as the case where focal points exist all the points on the scan line to be received.

While only a certain embodiment of the invention has been specifically described herein, it will be apparent that numerous modifications may be made thereto without departing from the spirit and scope of the invention.

What is claimed is:

1. An ultrasonic signal focusing method using an array transducer, the method comprising the steps of:

transmitting from the array transducer ultrasound signals;

receiving the ultrasound signals returning to a transducer element; and obtaining an ultrasonic focusing signal corresponding to each point on a particular scan line, using an ultrasonic signal obtained from each point on the particular scan line and ultrasonic signals obtained from each point on the particular scan line by different transmission scan lines adjacent to the particular scan line.

2. The ultrasonic signal focusing method according to claim 1, wherein said ultrasonic focusing signal obtaining step comprises:
   (a) an ultrasonic signal transmission step for moving, focusing and transmission scanning the transmission scan line in turn;
   (b) an ultrasonic signal reception step for receiving all the ultrasonic signals transmitted along the scan lines at the transducer elements which are placed in the location at which reception is enabled;
   (c) an ultrasonic storing step for storing all the received ultrasonic signals by each scan line; and
   (d) an ultrasonic focusing step for interpolating an arrival delay amount of the ultrasonic signals stored after arrival at a different point in time and summing the interpolated signal.

3. The ultrasonic signal focusing method according to claim 2, wherein said step (d) calculates a focusing delay amount considering a delay time returning to the respective transducer elements after the transmission focused and transmitted signal reaches the final focal point.

4. The ultrasonic signal focusing method according to claim 3, wherein said focusing delay amount $t_d(t, X_f, Z_f, X_e)$ is calculated by the following equation in order to be added to the received signal to reinforce the reference signal from the target point on the transmission scan line, $$t_d(t, X_f, Z_f, X_e) = t - \left[ \frac{Z_f - \sqrt{(Z_f - (vt/2))^2 + X_f^2}}{v} + \frac{\sqrt{(vt/2)^2 + X_e^2}}{v} \right]$$

wherein the transmission scan line passes through the point $(X_f, 0)$, the coordinate of the focal point is $(X_f, Z_f)$, the coordinate of the receiving transducer element is $(X_e, 0)$, the finally focused scan line passes through the origin $(0, 0)$, and the length of the path travelling from the target point to the surface of the transducer element is $vt/2$.

5. The ultrasonic signal focusing method according to claim 4, wherein said focusing delay amount $t_d(t, X_f, Z_f, X_e)$ is added to the signals of all the transducer elements with respect to all the transmission operations, and then all the added signals are summed and focused.

6. The ultrasonic signal focusing method according to claim 5, wherein the final focusing signal through adding said focusing delay amount, summing and focusing the added result, is calculated by the following equation, $$S_{focused}(t) = \sum_{X_e} \sum_{X_f} (A(t, X_e, X_f) \cdot s(t - t_d(t, X_f, Z_f, X_e), X_f, X_e, X_f))$$

in which $A(t, X_e, X_f)$ uses a respective appropriate function according to t, $X_e$, and $X_f$, and t is set to 0 every time when transmission is performed.

7. An ultrasonic focusing apparatus for focusing ultrasonic signal, comprising:
   an array transducer configured to have a different time delay in a transducer element located at a different place from each other, for performing lateral transmission focusing;
   a reception portion for appropriately amplifying the ultrasonic signal returning to the transducer element and converting the amplified result into a digital signal;
   an intra-channel processing portion for separate storing signals received from the reception portion receiving ultrasonic signals returning from a desired point, and separately storing the ultrasonic signals corresponding to each scan line every time when the received signals are transmitted, calculating a time delay to be applied to the stored ultrasonic received signals and focusing signals on various transmission scan lines in a single transducer element to correspond to all the transducer elements and outputting the focused signals; and
   a reception focusing portion for summing outputs of the intra-channel processing portion and completing a focusing operation using the signals output from all the transducer elements.

8. The ultrasonic signal focusing apparatus according to claim 7, wherein said reception focusing portion comprises:
   an intra-channel apodization value calculator for calculating a respective intra-channel apodization value;
   a multiplier for performing a multiplication operation of the signal applied from said intra-channel processing portion according to the apodization value applied from said intra-channel apodization value calculator; and
   an adder for adding the signal output from said multiplier and outputting the final focused value.

9. The ultrasonic signal focusing apparatus according to claim 7, wherein said intra-channel processing portion comprises:
   a number of buffer memories for storing radio frequency (RF) data converted into a digital signal from the received ultrasonic signal, according to a respective scan line;
   a write controller for outputting a control signal to store the RF data in the buffer memory;
   a focusing delay amount calculator for calculating a focusing delay time to focus the RF data stored in the buffer memory;
   a read controller for outputting a control signal to read the ultrasonic signal stored in the buffer memory according to a read address applied from the focusing delay amount calculator;
   a delay interpolator for interpolating the signal according to the focusing delay amount calculated in said focusing delay amount calculator and delaying the signal by an accurate amount; and
   an apodization portion for applying a weight value to the signal delayed from said delay interpolator, and adding the weight applied signals.

10. The ultrasonic signal focusing apparatus according to claim 9, wherein said apodization portion comprises:
    an intra-channel apodization value calculator for calculating the apodization value;
    a multiplier for multiplying the signal applied from said intra-channel processing portion by an appropriate weight value according to the apodization value applied from said intra-channel apodization value calculator; and
    an adder for adding all the signals output from said multiplier and outputting a value for which an apodization is performed with respect to a scan line.

* * * * *